(12) United States Patent
Fripp et al.

(10) Patent No.: US 6,998,999 B2
(45) Date of Patent: Feb. 14, 2006

(54) HYBRID PIEZOELECTRIC AND MAGNETOSTRICTIVE ACTUATOR

(75) Inventors: Michael L. Fripp, Carrollton, TX (US); Roger L. Schultz, Aubrey, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 422 days.

(21) Appl. No.: 10/409,558

(22) Filed: Apr. 8, 2003

(65) Prior Publication Data

US 2004/0202047 A1 Oct. 14, 2004

(51) Int. Cl.
 *G01V 3/00* (2006.01)

(52) U.S. Cl. .............................. 340/854.4; 340/854.3; 367/82; 310/334; 73/570; 166/250.01

(58) Field of Classification Search ............. 340/854.4, 340/854.3; 367/82; 310/334; 73/570; 166/250.01
See application file for complete search history.

(56) References Cited

U.S. PATENT DOCUMENTS

| | | | |
|---|---|---|---|
| 3,970,877 A | 7/1976 | Russell et al. ................ 310/8.3 |
| 4,356,629 A | 11/1982 | Jeter et al. ..................... 29/885 |
| 4,518,888 A | 5/1985 | Zabcik .......................... 310/334 |
| 5,031,158 A | 7/1991 | Chamuel ..................... 367/118 |
| 5,357,486 A | 10/1994 | Pearce ......................... 367/159 |
| 5,839,508 A | 11/1998 | Tubel et al. ................ 166/65.1 |
| 5,869,189 A | 2/1999 | Hagood, IV et al. ........ 428/461 |
| 5,924,499 A | 7/1999 | Birchak et al. ................ 175/40 |
| 6,048,622 A | 4/2000 | Hagood, IV et al. ........ 428/461 |
| 6,102,152 A | 8/2000 | Masino et al. ............... 181/106 |
| 6,131,659 A | 10/2000 | Johnson .................. 166/250.05 |
| 6,248,394 B1 | 6/2001 | Du et al. ..................... 427/100 |
| 6,337,465 B1 | 1/2002 | Masters et al. ......... 219/121.85 |
| 6,378,364 B1 | 4/2002 | Pelletier et al. ........... 73/152.47 |
| 6,401,538 B1 | 6/2002 | Han et al. ...................... 73/599 |
| 6,412,354 B1 | 7/2002 | Birchak et al. ......... 73/861.356 |

OTHER PUBLICATIONS

Kotera, et al., "*Piezoelectric Properties of PZT Thin Film*", Matsushita Electric Industrial Co., Ltd.
Kholkin, et al., "*Poling Effect On The Piezoelectric Properties of PZT Thin Films*".
Phillips, James R., "*Piezoelectric Technology Primer*".
Braithwaite, et al., "*Materials in Action Series, Electronic Materials*".
Clark, et al., "*Adaptive Structures*".

*Primary Examiner*—Albert K. Wong
(74) *Attorney, Agent, or Firm*—Albert C. Metrailer

(57) ABSTRACT

An electromechanical transducer formed by an electrical and mechanical combination of a piezoelectric device and a magnetostrictive device. The two devices are electrically coupled so that their capacitive and inductive reactances approach a balance to provide an essentially resistive combined input at a selected frequency. Efficiency of circuits driving the transducer is improved. The devices are mechanically coupled so that the mechanical outputs add or reinforce each other. Two transducer pairs may be used in a two frequency telemetry system with each pair tuned to one of the frequencies for optimal reactance balancing and transduction efficiency.

49 Claims, 5 Drawing Sheets

HYBRID PIEZOELECTRIC AND MAGNETOSTRICTIVE ACTUATOR

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This disclosure relates to electromechanical transducers and more particularly to the combination of a transducer with capacitive reactance and a transducer with inductive reactance in a single electrical circuit.

BACKGROUND OF THE INVENTION

Both piezoceramic devices and magnetostrictive devices are known to be useful as solid state actuators or electromechanical transducers which can produce mechanical motion or force in response to a driving electrical signal. These devices have been used, for example, to generate vibrations, i.e. acoustic waves, in pipes as a means of telemetering information. Such transducers are used in drilling operations to send information from down hole instruments to surface receivers. The down hole instruments generally produce an electrical waveform which drives the electromechanical transducer. The transducer generates acoustic waves in a drill pipe which travel up the drill pipe and are detected at the surface. The detected acoustic signals are converted back to electrical signals by electromechanical transducers such as accelerometers or which may be essentially identical to the devices which transmitted the signals. The detected electrical signals are decoded to recover the information produced by the down hole instruments.

The power available from down hole instruments to drive the signal transducers is limited, since they are normally battery powered. It is important that the driving signal be efficiently converted to acoustic signals in the drill pipe. However, piezoceramic transducers are highly capacitive. In similar fashion, magnetostrictive transducers are hightly inductive. These reactive characteristics reduce the transduction efficiency, i.e. the ability to convert electrical power into acoustic power, of the telemetry system.

The capacitive nature of the piezoceramic transducers has required design of driving circuits which can drive capacitive loads or the use of an inductor with the transducer to reduce effective reactance. Likewise, the inductive nature of magnetostrictive transducers has required design of driving circuits which can drive inductive loads or the use of a capacitor with the transducer to reduce effective reactance.

It would be desirable to provide an electromechanical transducer which allows more efficient conversion of electrical power into acoustic signals.

SUMMARY OF THE INVENTION

The present disclosure provides an electromechanical transducer including the combination of both a transducer with capacitive impedance and a transducer with inductive impedance coupled both electrically and mechanically. The electrical coupling of the transducers provides a reduced reactance load for circuits driving the combined transducer, thereby increasing electrical efficiency. The mechanical coupling increases the total mechanical output of the combined transducer. The net effect is improved transduction efficiency.

In one embodiment, a capacitive transducer and an inductive transducer are electrically and mechanically coupled in series. By proper selection of reactive impedances, the combined transducer has low impedance at a selected frequency. The mechanical outputs of the devices reinforce each other to provide an increased acoustic response.

In another embodiment, where the mechanical outputs of a capacitive transducer and an inductive transducer are out of phase, the devices are coupled to a signal transmission medium at points spaced apart by a distance related to the signal wavelength in the medium to provide acoustic signal reinforcement.

In one embodiment, the capacitive transducer is a piezoelectric device and the inductive transducer is a magnetostrictive device.

DETAILED DESCRIPTION OF EMBODIMENTS

For the purposes of this disclosure, an electromechanical transducer or actuator is any device which can be driven by an electrical input and which provides a mechanical output in the form of a force or motion. Many electromechanical transducers also respond to a mechanical input, generally a force, by generating an electrical output. For purposes of the present disclosure, each transducer is considered to have an electrical connection and a mechanical connection. Each connection may be considered to be an input or an output or both, depending on whether the transducer is being used at the time to convert electrical energy into force or motion or to convert force or motion into electrical energy.

Many electromechanical transducers have a reactive impedance at their electrical connection and may be either capacitive in nature or inductive in nature. Capacitive transducers are generally driven by an electrical field, normally by applying a voltage across an electrical connection comprising a pair of electrodes, and change shape in response to the applied field. Capacitive electromechanical transducers may be made of various materials which may be piezoelectric materials including piezoceramic, PZT (lead-zirconate-titanate), piezopolymer, and quartz materials or may be electrostrictor, ferroelectric, relaxor ferroelectric, electroactive polymer, shape memory ceramic, electrostatic actuator, etc. materials. These materials usually respond to mechanical force or motion applied to their mechanical connection by generating an electric field which produces a voltage on its electrical connection.

Electromechanical transducers with an inductive electrical response typically have an electrical connection comprising coils of wire in order to create or detect a magnetic field. One class of inductive transducer is a magnetostrictive device, or magnetostrictor, in which a magnetic field generated by applying a current to a coil causes a magnetostrictive core to change shape. Various materials, e.g. iron and iron alloys such as terfenol, provide magnetostrictive and giant magnetostrictive responses. These materials normally respond to a force applied to their mechanical connection by creating a magnetic field which can be detected by the coil. Another class of inductive electromechanical transducer is a voice coil, such as in a common force shaker.

Figure 1:
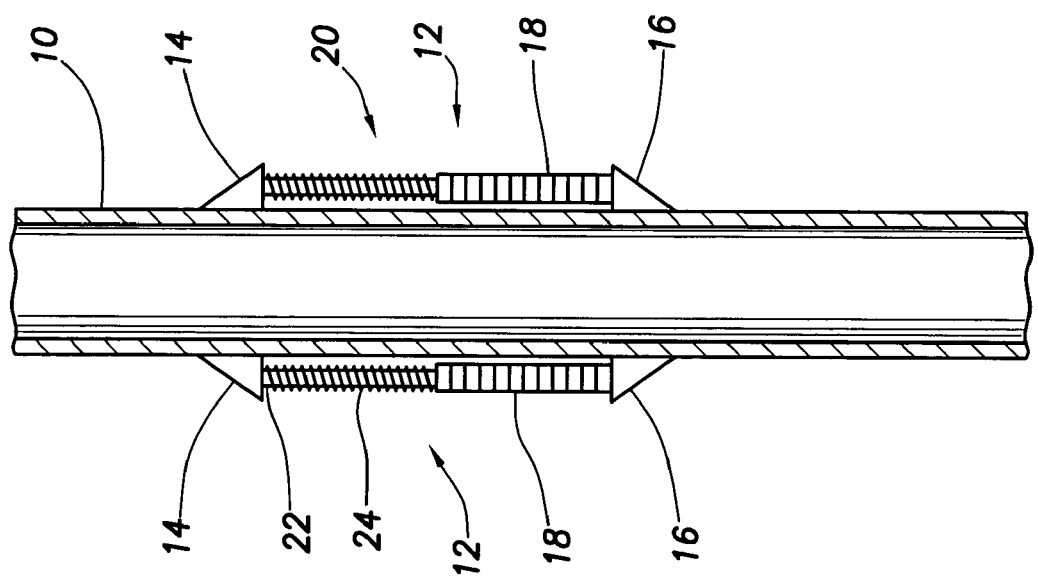
FIG. 1 is a cross sectional view of a tubular signal transmission medium with a pair of combined piezoelectric and magnetostrictive electromechanical transducers according to the present disclosure.

FIG. 1 is an illustration of an embodiment of the present disclosure useful for telemetry of signals in a borehole. A length of pipe 10 may be part of a drill string in a borehole. In a drilling environment, the pipe 10 serves several purposes. It may transmit turning forces to a drill bit on the bottom of the drill string and normally acts as a conduit for flowing drilling fluid down the well to the bit. In this embodiment, it also provides an acoustic signal transmission medium for sending information from sensors or detectors in the borehole to equipment at the surface location of the well. A pair of electromechanical transducers 12 have mechanical connections coupled to the pipe 10 by upper and lower shoulders 14 and 16 which are attached to the pipe 10. Each transducer 12 includes a capacitive electromechanical transducer 18 and an inductive electromechanical transducer 20 having mechanical connections coupled in series or stacked on top of each other between shoulders 14, 16. Mechanical forces generated by the devices 18 and 20 add together and are coupled to the pipe 10 through the shoulders 14, 16. When the transducers 12 are driven with an oscillating electrical signal, they induce a corresponding axial compression signal in the pipe 10. It is desirable to have two transducers 12 spaced on opposite sides of pipe 10, as illustrated, and driven with the same electrical signal to avoid applying bending forces to the pipe 10.

One or more additional sets of transducers 12 may be positioned on a drill string of which pipe 10 is a part. A set at or near the surface location of the well may detect the transmitted axial compression signals through its mechanical connections and generate a corresponding electrical signal at its electrical connections. The electrical signal may be coupled to a decoder which recovers signals sent from the down hole location. One or more sets between a bottom hole location and the surface location may be part of a repeater which may be needed in deep wells. A repeater may have one set of transducers 12 for receiving signals from deeper in the well and a second set for retransmitting the signals toward the surface location. Since the transducers 12 function both as transmitters and receivers or sensors, a single set may be used for both functions in a repeater.

While the acoustic signal transmission medium in the FIG. 1 embodiment is a drill string, other elements commonly used in boreholes may also be used as an acoustic transmission medium. For example, various other tubular goods used as a completion string, production string or service string may also serve as a signal medium. These elements may be in the form of jointed pipe or continuous pipe, often referred to as coiled tubing. Other suitable signal transmission media includes slick line, wire line, electric line and the like. Acoustic signals may also be transmitted through fluids in the borehole or through earth formations surrounding the borehole.

The capacitive electromechanical transducer 18 is illustrated as a cylinder, and in one embodiment is made of a piezoceramic material, but may alternatively be made of other materials or in other shapes providing a capacitive transducer response such as those listed above. In this embodiment, transducer 18 is made of a number of piezoceramic disks bonded together to form the cylinder shape. Between each pair of disks is an electrically conductive layer or electrode which allows application of electrical fields to the disks. Alternate electrodes are electrically coupled in parallel to form the electrical connection of the transducer 18. Polarities of alternate disks are reversed so that upon application of a voltage between successive electrodes, each disk changes shape and the entire stack changes shape by the sum of the change in each disk. The ends of the cylindrical stack of disks form the mechanical connection of the transducer 18. This construction of a piezoceramic transducer is conventional.

Figure 4:
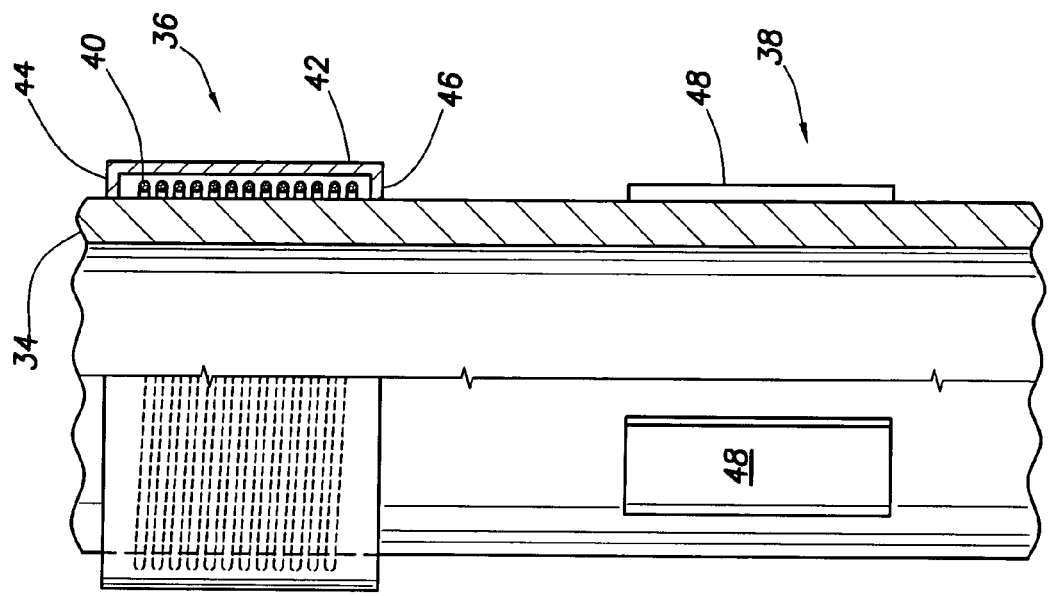
FIG. 4 is a partially cross sectional view of another embodiment of a pair of electromechanical transducers combined according to the present disclosure.

The inductive electromechanical transducer 20 may also be of conventional construction. In this embodiment, it includes a magnetostrictive rod 22 surrounded by a wire coil 124. The wire coil forms the electrical connection of the transducer 20. The rod 22 may be made of iron or an alloy of iron with terbium and dysprosium, e.g. terfenol, or any other material known to have magnetostrictive or giant magnetostrictive properties such as those listed above. The ends of the rod 22 form the mechanical connection of the transducer 20. Although not shown in FIG. 1, in some embodiments it is desirable to provide a biasing magnetic field for the rod 22. This may be done by encasing the device 20 in a cylinder or sleeve which has been permanently magnetized. A biasing sleeve is shown in FIG. 4.

Figure 2:
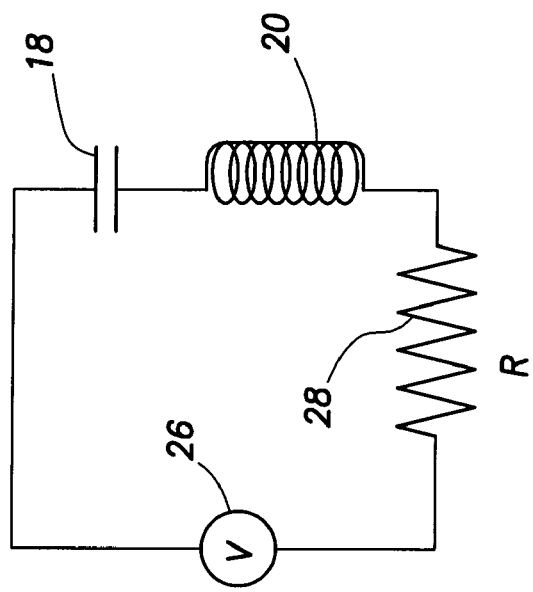
FIG. 2 is an electrical schematic diagram of connection of the transducers of FIG. 1 with a source of electrical signal.

FIG. 2 illustrates one embodiment of a circuit for the electrical connection of capacitive transducer 18, represented as a capacitor, and the electrical connection of inductive transducer 20, represented as an inductor, and a source of electrical signal 26. The schematic diagram also includes a resistance 28 representing inherent resistance in the various components and conductors. Alternatively, resistance 28 may include a separate resistor selected to match the impedance of a power supply or may include a resistive electromechanical transducer such as a shape memory alloy device mechanically coupled to the transducers-18 and 20. All of these components 18, 20, 26 and 28 are electrically connected in series. The electrical source 26 may be the output signal driver from a down hole instrument package, e.g. a logging while drilling package built into the drill string. Such packages generally produce information in digital form which may be encoded into a two frequency, or dual tone, signal, one frequency representing a one and the other representing a zero. The signal source 26 drives the devices 18 and 20 with these tones to apply acoustic waves at these frequencies on the drill pipe 10 for transmission to another location of the well where the tones may be received by similar transducers and decoded into a digital signal. The other well location may be at the surface of the well or an intermediate location where a repeater may receive and retransmit the signal.

Figure 3:
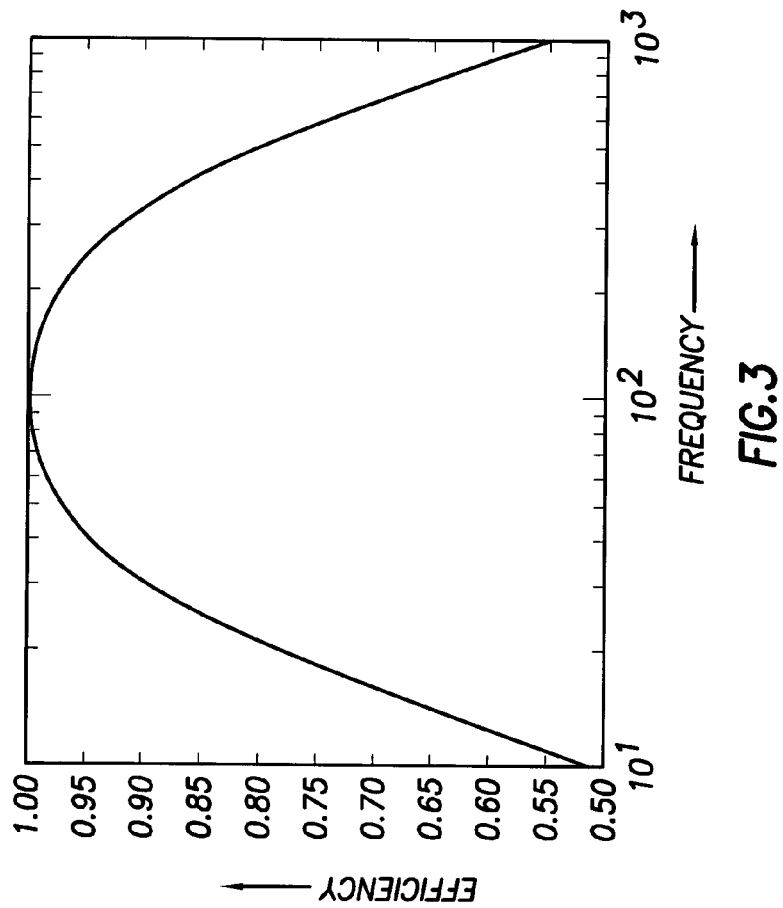
FIG. 3 is a plot of transduction efficiency versus frequency: for the combined transducers of FIG. 1.

With reference to FIG. 3, the effect of series connection of the devices 18, 20 is illustrated. FIG. 3 plots the transduction efficiency of the circuit of FIG. 2 versus frequency. For this example, the capacitance of transducer 18 is selected to be 1.3e−3 farad, the inductance of transducer 20 is selected to be 0.07 henry and the resistance 28 is 46 ohms. The frequency scale is in radians per second. With these values, the plot shows efficiency of 100% at a frequency of 100. At this frequency, the reactance of the capacitor 18 exactly balances the reactance of inductor 20 so that the combined reactance appears to be zero and the impedance purely resistive, i.e. current and voltage are in phase. However, as noted above, to transmit a digital signal, two frequencies are normally needed. In this embodiment, the transmission frequencies may be selected at 30 and 300 and the transduction efficiency at both frequencies will be about 93%. Thus, the frequency range of efficient transduction performance tends to be broad enough to allow selection of well separated dual tone frequencies with high transduction efficiency.

The plot of FIG. 3 is based only on the impedances of the transducers 18 and 20. The system response of a transducer is more complicated because it is also affected by the mechanical resonance of the transducer and the mechanical elements to which it is connected. To achieve the highest transduction efficiency, which is a typical goal, the mechanical resonance should be at the same frequency as the electrical resonance. In that case, FIG. 3 is a good representation of the system response.

However, in some cases, it may be desirable to have a good transduction efficiency across a broader frequency band. For example, some of the alternate encoding methods mentioned below may work better with a broader system frequency response. The frequency response of the system may be broadened by intentionally setting the electrical resonance point at a different frequency than the mechanical system resonance. Generally, it is easier to adjust the electrical resonance than the mechanical. For example, if the electrical system represented in FIG. 3 is combined with a mechanical system with a resonance at about 900 Hz, the combined system will have a relatively flat system frequency response from about 30 Hz to about 930 Hz. There is normally a tradeoff between peak response and breadth of frequency response. That is, it can be expected that the peak response of this system with a 900 Hz breadth will be lower than the FIG. 3 system with a somewhat flat response across only about 300 Hz.

The system frequency response may also be broadened by adding electrical resistance to the circuit, e.g. resistor 28 of FIG. 2, or by adding mechanical damping to the system. These methods of flattening frequency response can also be expected to reduce peak system response.

While dual tone encoding is used in this example, other encoding schemes may be used if desired. For example, the encoding could by amplitude modulation of a single carrier frequency. The encoding could be a discrete multi-tone encoding where the information is carried across a plurality of single frequencies, which would help to ensure that the carrier frequency does not correspond to a stop band on the system. The encoding could be any of the forms used in the telecommunications industry, including QAM (Quadrature Amplitude Modulation), VDSL (Very high bit-rate Digital Subscriber Line), ADSL (Asymmetric Digital Subscriber Line), CDMA (Code Division Multiple Access), etc.

FIG. 4 illustrates an alternative embodiment of the present disclosure. A section of pipe 34 may be a part of a drill string, work string, etc. as discussed above. A magnetostrictive transducer 36 and a piezoelectric transducer 38 are shown attached to, or essentially integrated with, the pipe 34.

In this embodiment, an inductive type transducer 36 is formed primarily of an electrical coil 40 wrapped around the pipe 34. The pipe 34 itself may act as a magnetostrictive element which provides mechanical motion in response to current in coil 40. An outer sleeve 42 is positioned around the coil 40 and is coupled to the outer surface of pipe 34 at its upper end 44 above the coil 40 and at its lower end 46 below the coil 40. The body of sleeve 42 is preferably permanently magnetized to provide a biasing magnetic field to the portion of pipe 34 surrounded by the coil 40, although in alternative embodiments the sleeve may not be magnetized. As noted above, iron itself is a magnetostrictive material. If desired, the pipe 34, or the portion surrounded by coil 40, may be made of an alloy having stronger magnetostrictive response than simple iron.

In a further alternative, the sleeve 42 may be made of magnetostrictive material and its mechanical response may be coupled to the pipe 34 at its ends 44 and 46. The portion of steel pipe 34 inside the coil 40 would act as a magnetic core which increases the magnetic field applied to the sleeve 42. It may also have a permanent magnetic field to bias the sleeve 42. The sleeve 42 completes the magnetic circuit around coil 40. A portion of sleeve 42 could be permanently magnetized for biasing purposes if desired. The total cross section of magnetostrictive material can easily equal or exceed that used in the prior art devices using two rods 22 as illustrated in FIG. 1. The acoustic output of this arrangement is inherently uniform and in alignment with the axis of the pipe 34.

Figure 5:
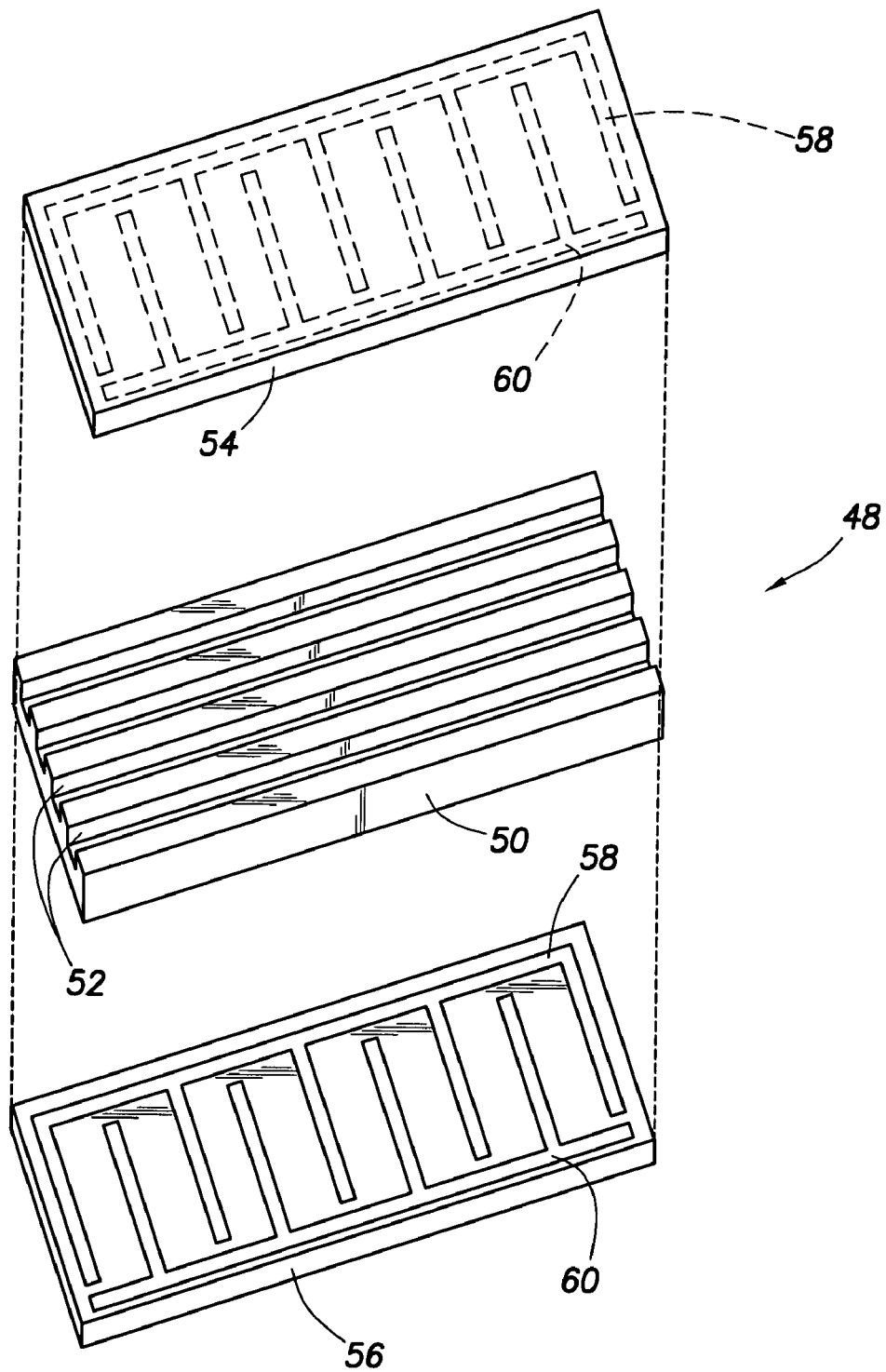
FIG. 5 is an exploded view of a flexible piezoelectric transducer suitable for use in the FIG. 4 embodiment.

The capacitive transducer 38 is formed of a plurality of thin, preferably flexible, piezoelectric devices 48 bonded to the outer surface of the pipe 34. FIG. 5 illustrates one embodiment of the structure of a suitable transducer 48. The center of device 48 may be formed of a thin rectangular slab 50 of piezoceramic, e.g. PZT (lead-zirconate-titanate), which has been machined to be made flexible. A series of grooves 52 has been machined, e.g. by laser etching, along the long dimension of the slab. The grooves make the slab flexible, especially across its short dimension. The grooved piezoceramic slab 50 may be made by laser beam machining according to the teachings of U.S. Pat. No. 6,337,465 issued to Masters et al. on Jan. 8, 2002 which is incorporated herein for all purposes.

Flexible insulating sheets 54 and 56 are bonded to the upper grooved and lower ungrooved surfaces of the slab 50, by for example an epoxy adhesive. In this embodiment, the flexible sheets 54 and 56 are made of a copper coated polyimide film, e.g. a film sold under the trademark Kapton. The copper coating has been etched to form a set of interdigitated electrodes 58 and 60 on sheets 54 and 56. The electrodes are shown in phantom on sheet 54 because in the exploded view, they lie on the lower side of sheet 54. The electrodes 58 and 60 form the electrical connection for the completed transducer. When the sheets 54 and, 56 are attached to the slab, the electrodes 58 and 60 are positioned between the sheets and the slab.

The slab 52 may be made of many known piezoelectric materials such as those mentioned above. Typical devices 48 have a length of about 2.5 inches and a width of about one inch. The thickness of slab 50 may be from about 0.001 inch to 0.500 inch. For use in embodiments described herein, the thickness may be from about 0.005 to about 0.025 inch. The length is desirably at least twenty times the thickness to minimize end effects. Greater thickness provides more mechanical power, but reduces the flexibility of the devices. Devices as shown in FIG. 5 having a slab 50 thickness of about 0.020 inch can be bent around and bonded to a pipe having an outer diameter of about 3.5 inches or larger. For a thickness of about 0.010 inch, the devices can be bent around a pipe having an outer diameter of about one inch or larger. For best acoustic impedance match, it would be desirable for the thickness of slab 50 to equal the wall thickness of the pipe to which it is bonded. Generally, this is not practical because this would result in a transducer which would be too stiff to be bent around the pipe, and, as explained below, too thick for generation of desired electrical fields at practical voltages. Thus, the specific dimensions of the flexible transducers used in the FIG. 4 embodiment will be selected according to the available material lengths and widths. Thinner slabs 50 or multiple devices 48 may be stacked to create the transducer behavior of a thicker slab without compromising the flexibility of the device and without requiring undesirable driving voltages.

The thickness of the slab 50 also affects the electrical connection of the device 48. As the device is made thicker, the electrode voltage needed to provide a desirable field increases. Use of thinner devices allows use of lower driving voltages which is desirable. When these electrical interface considerations are considered along with the flexibility factors, a slab thickness of about 0.010 inch provides a good compromise. As noted above, multiple devices may be stacked to increase mechanical power, while maintaining mechanical flexibility and low driving voltage.

Other flexible piezoelectric transducers may be used in place of the particular embodiment shown in FIG. 5. For example, U.S. Pat. Nos. 5,869,189 and 6,048,622 issued to Hagood, IV et al. on Feb. 9, 1999 and Apr. 11, 2000, which are incorporated herein for all purposes, disclose a suitable alternative. The Hagood transducer uses a plurality of flexible piezoceramic fibers aligned in a flat ribbon of a relatively soft polymer. Flexible electrodes like those shown in FIG. 5 are positioned on opposite sides of the composite transducer for activating the device. Flexible piezopolymers may also be used in relatively low temperature applications. This temperature limitation normally prevents using piezopolymers in down hole applications. Piezopolymers also typically lack sufficient stiffness or induced stress capability to be used for structural actuation.

This type of transducer 48 is also described in more detail in a copending U.S. patent application Ser. No. 10/409,515, entitled Flexible Piezoelectric For Downhole Sensing, Actuation and Health Monitoring, by inventors Michael L. Fripp, John P. Rodgers and Roger L. Schultz, filed on the same date as this application and assigned to the same assignee, which application is hereby incorporated by reference for all purposes. As with the FIG. 1 embodiment, devices 48 may be applied in pairs on opposite sides of the pipe 34 to avoid application of bending forces to the pipe 34. A plurality of the devices 48 may be distributed axially along the pipe 34 as needed to achieve a desired power level.

In the embodiment of FIG. 4, the transducers 36 and 38 have electrical connections coupled together in series as illustrated in FIG. 2 and provide the same reactive balancing effect as illustrated in FIG. 3. However, the mechanical connections of the transducers 36 and 38 provide several advantages over the FIG. 1 embodiment. The transducers of FIG. 4 extend a shorter radial distance from the outer surface of the pipe 34, than the shoulders 14, 16 required for mechanical coupling in the FIG. 1 arrangement. The sleeve 42 not only provides a magnetic bias, but also provides mechanical protection for the coil 40 and provides a smooth round outer surface for the drill pipe 34. It may extend from the pipe 34 a shorter distance than a typical drill collar or coupling. The piezoelectric devices 48 are likewise much thinner than typical prior art piezoceramic stacks. Since the devices 48 are bonded, e.g. with epoxy cement, to the pipe 34 they are structurally rugged. If desired, the devices 48 may be wrapped with a composite layer, e.g. fiberglass, as part of the bonding process.

In the embodiment of FIG. 4, at least one large planar surface of the devices 48, is bonded by an adhesive to a surface of the pipe 34. For purposes of the present invention, the term "bonded" means any mechanical attachment of the mechanical connection of a transducer which causes the transducer to experience essentially the same strains as the member to which it is bonded. Thus in some cases, only the ends and or edges of the devices 34 may be attached by adhesive to a surface in order for the strains to be the same. The devices 48 may be attached by adhesive to an intermediate part, e.g. a piece of shim, which is attached to the surface by bolting, welding, an adhesive, etc. In similar fashion, a wrap of a protective composite may bond the devices to the surface sufficiently to ensure that the strains are shared. Thus, the devices 12 of FIG. 1 may be considered bonded to the pipe 10 by being clamped between shoulders 14 and 16, whether or not an adhesive is used to attach the mechanical connections, i.e. the ends, of the devices 12 to the shoulders 14 and 16.

If desired, some or all of the piezoelectric devices 48 of FIG. 4 may be positioned on pipe 34 under the coil 40. This would place the mechanical connection of the transducers 36 and 38 in parallel rather than in series as shown in FIGS. 1 and 4. A parallel arrangement may increase the force available from the hybrid transducer. This arrangement requires proper selection of materials to ensure proper phasing of the mechanical outputs of the transducers.

As noted above with reference to FIG. 3, it is desirable in some embodiments to transmit two different frequencies as a way of encoding digital signals. However, for a single transducer pair as illustrated in FIGS. 1 and 4, the best reactive cancellation or balancing occurs at only one frequency. As also noted above, the mechanical outputs of the two types of transducers may or may not be in proper phase depending on various factors such as material selection.

Figure 6:
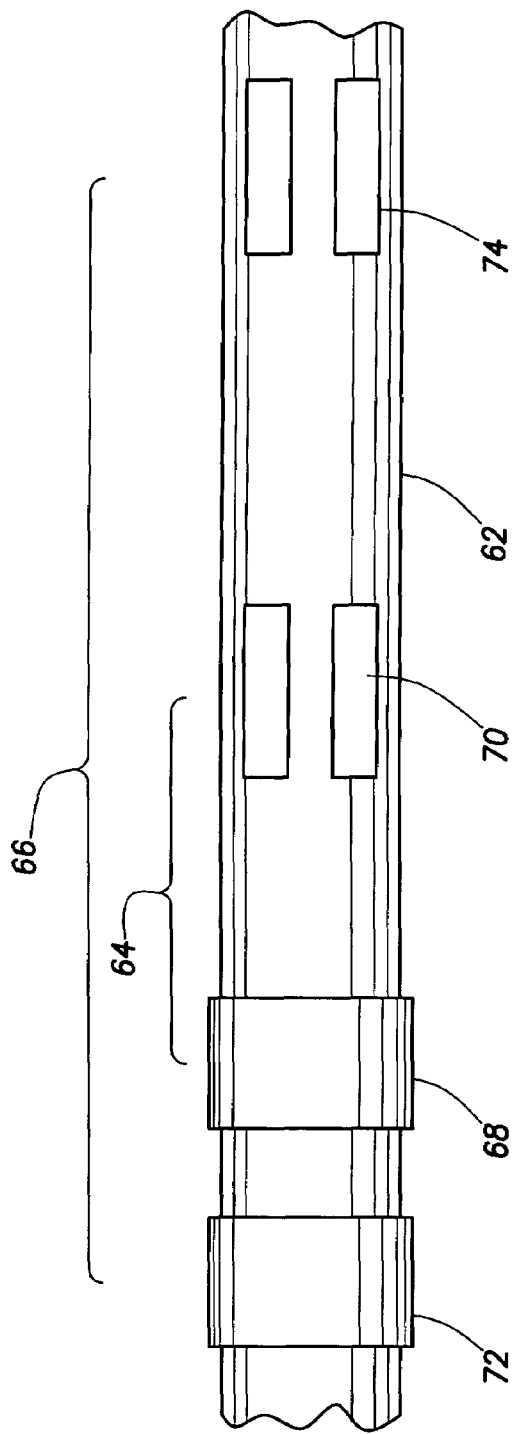
FIG. 6 is an illustration of placement of a plurality of piezoelectric and magnetostrictive transducers on a signal transmission medium to provide signal reinforcement at two different frequencies.

FIG. 6 illustrates an embodiment which provides reactive balancing at two frequencies and phasing of acoustic outputs from combined capacitive and inductive transducers at those frequencies. A drill pipe 62 is shown with two transducer pairs 64 and 66. Transducer pair 64 includes an inductive device 68, which may be the same as the device 36 of FIG. 4, and a set of capacitive devices 70, which may be the same as the devices 48 of FIG. 4. Transducer pair 66 includes inductive device 72, which may be the same as the device 36 of FIG. 4, and a set of capacitive devices 74, which may be the same as the devices 48 of FIG. 4. The spacing between devices 68 and 70 of transducer pair 64 is less than the spacing between devices 72 and 74 of transducer pair 66. As illustrated, the devices 68 and 70 may be positioned on the pipe 62 between the positions of devices 72 and 74.

Each of the transducer pairs 64 and 66 may have a separate driving circuit as illustrated in FIG. 2. In this case, two voltage sources 26 may be fixed frequency oscillators, one representing a digital one and the other a digital zero. Digital signals can be transmitted by alternately activating the two oscillators to transmit the desired digital signals.

This arrangement allows tuning of each of the transducer pairs 64, 66 so that they appear to be essentially resistive at the selected frequencies. That is, each pair 64, 66 would have its own curve like FIG. 3 centered on the desired frequency.

The particular spacings selected for transducer pairs 64 and 66 depend on several factors. For this embodiment, it is assumed that when the electrical connections are driven in a single circuit as shown in FIG. 2, the mechanical connections of the magnetostrictive devices 68, 72 are out of phase with the mechanical connections of the piezoelectric devices 70, 74 by ninety degrees or one-quarter wavelength. In that case, the spacings for the pairs 64 and 66 may be selected to be equal to the physical length of one-quarter wavelength of the acoustic signal in pipe 62 at the selected transmission frequencies. With these spacings, the mechanical waveforms are in phase and reinforce to generate a stronger acoustic signal in the pipe 62.

In the FIG. 6 embodiment, two pairs of transducers may be implemented with only three transducers if desired. For example, magnetostrictive device 68 could be omitted. The pair 64 would then be formed between devices 72 and 70. The pair 66 would still be formed between devices 72 and 74. That is, device 72 can be part of two different pairs. This embodiment would presumably involve different driving circuitry than that used for two fully distinct pairs of transducers.

The devices 68 and 72 could be at the same location on pipe 62 and could be formed by two separate coils wound together or one on top of the other. This would allow use of only one magnetic biasing housing for both devices 68, 72, while keeping the driving circuits separated. If special materials are used to form the section of pipe surrounded by the coils, this arrangement would require less materials and use of only one special section.

The above description of the FIG. 6 embodiment is made with the presumption that a telemetry system with a dual tone encoding scheme is desired. In some cases, it is desirable to have more available frequencies, for example to allow selection of frequencies to avoid ambient noise. With simple switching of the electrical connections of the transducers of FIG. 6, at least four different frequencies are available. The additional two frequencies may be provided by pairing inductive transducer 72 with capacitive transducer 70 and pairing inductive transducer 68 with capacitive transducer 74.

Figure 7:
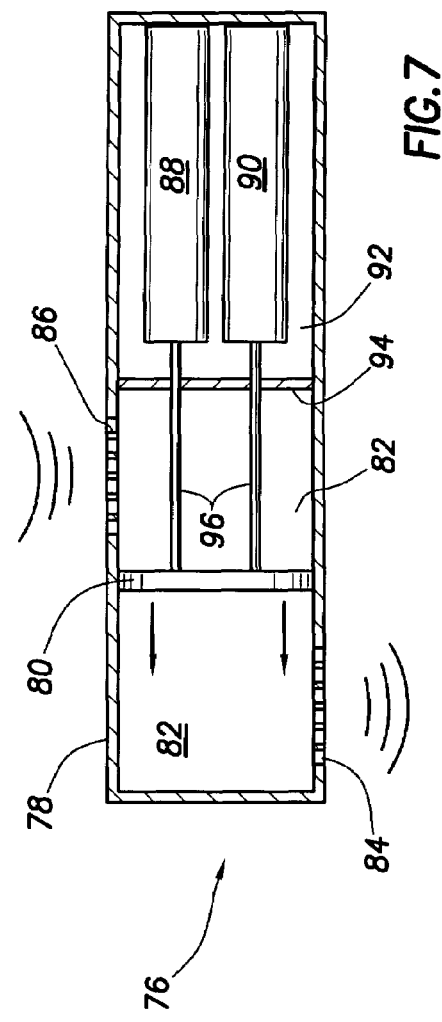
FIGS. 7, 8, and 9 illustrate various embodiments of a dipole acoustic source for borehole logging using hybrid transducers according to the present invention.
Figure 8:
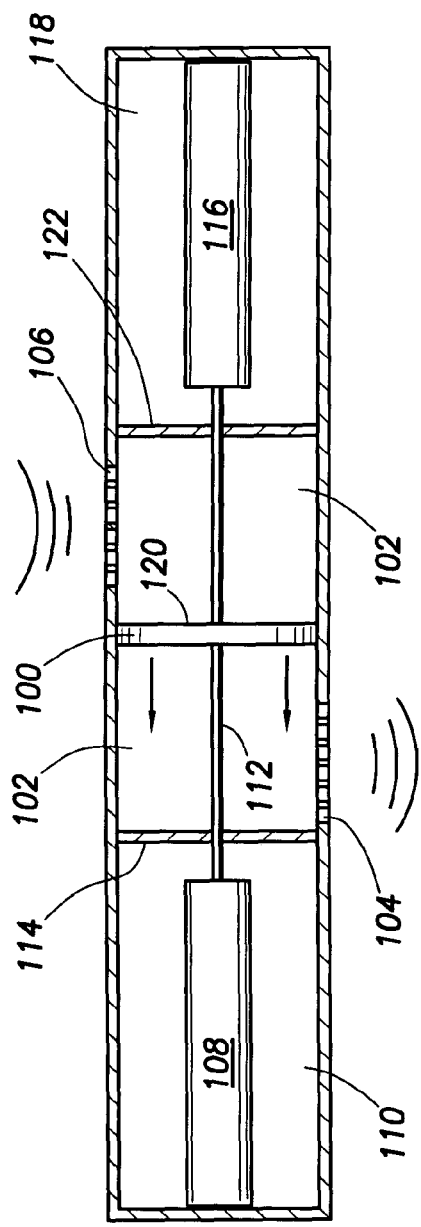
Figure 9:
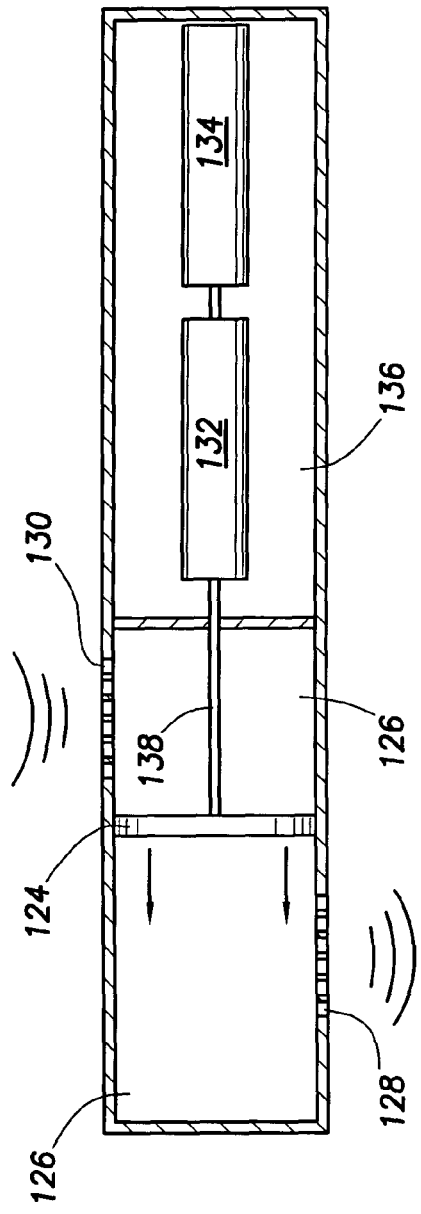

FIGS. 7, 8, and 9 illustrate the use of hybrid actuators according to the present invention in a dipole acoustic signal source, typically used in borehole sonic logging. In FIG. 7, a borehole dipole sonic signal generator 76 is assembled in a cylindrical housing 78. A piston or diaphragm 80 is carried in a fluid filled chamber 82 in one end of the housing 78. Ports 84 and 86 are provided on opposite sides of the housing 78 to provide communication of fluid waves from inside chamber 82 to fluids surrounding the housing 78. The ports 84 and 86 are radially opposed by about 180 degrees and are positioned on opposite sides of the piston 80. Movement of the piston 80 generates pressure waves from ports 84 and 86 which are out of phase by 180 degrees, thereby providing a dipole acoustic source.

A pair of actuators 88 and 90 are carried in a second chamber 92 in housing 78. Chamber 92 is separated from chamber 82 by a fluid tight partition 94. One or more rods 96 pass through partition 94 with fluid tight sliding seals. The rods 96 couple mechanical outputs of actuators 88 and 90 to the piston 80. The actuator 88 may be a magnetostrictive device like actuator 20 of FIG. 1. The actuator 90 may be a piezoelectric actuator, like actuator 18 of FIG. 1. The actuators 88 and 90 have their electrical connections coupled in a circuit like FIG. 2.

The FIG. 7 embodiment places the actuators 88 and 90 mechanically in parallel and electrically in series. The parallel mechanical arrangement increases the force imparted on the piston 80. The series electrical connection provides reactance balancing as described above.

FIG. 8 illustrates another embodiment of a dipole acoustic source. In FIG. 8, a piston or diaphragm 100 is carried in a fluid filled chamber 102. Ports 104 and 106 provide dipole sonic wave outputs like the FIG. 7 arrangement. A piezoelectric actuator 108, like actuator 18 of FIG. 1, is carried within a chamber 110 on one side of chamber 102. Actuator 108 is mechanically coupled to piston 100 by a rod or shaft 112 which passes through a fluid tight partition 114 separating chambers 102 and 110. A magnetostrictive transducer 116 is carried in a chamber 118 on an opposite side of chamber 102. Actuator 116 is mechanically coupled to piston 100 by a rod or shaft 120 which passes through a fluid tight partition 122 separating chambers 102 and 118. The actuators 108 and 116 have their electrical connections coupled in a circuit like-FIG. 2.

The FIG. 8 embodiment also places the actuators 108 and 116 mechanically in parallel and electrically in series. The parallel mechanical arrangement increases the force imparted on the piston 100. The series electrical connection provides reactance balancing as described above.

FIG. 9 illustrates another dipole acoustic source in which actuators are mechanically coupled in series. In the FIG. 9 embodiment, a piston 124 is carried in fluid filled chamber 126. Opposed ports 128 and 130 provide dipole sonic wave outputs like the FIG. 7 and FIG. 8 arrangements. A piezoelectric actuator 132, like actuator 18 of FIG. 1, and a magnetostrictive actuator 134, like actuator 20 of FIG. 1, are carried within a chamber 136. The actuators 132 and 134 are coupled in series as indicated. A rod 138 couples the combined mechanical output of actuators 132 and 134 to the piston 124 through a partition 140 separating the chambers 126 and 136.

In the FIG. 9 embodiment, the actuators 132 and 134 are mechanically coupled in series like the actuators 18 and 20 of FIG. 1. This arrangement increases the amount of stroke or motion which the actuators impart upon the piston 124. The electrical connections of actuators 132 and 134 may be coupled in series as shown in FIG. 2, to provide reactance balancing as discussed herein.

While the embodiments of FIGS. 7, 8, and 9 are of dipole acoustic signal sources, the present invention is equally useful in other acoustic signal sources. For example, if the ports 84 and 86 of FIG. 7 are positioned on the same side of the chamber 82 or uniformly distributed around the entire circumference of chamber 82, the device acts as a monopole source.

The transducers of the present disclosure may also be useful in applications other than signal telemetry and acoustic logging. For example, electromechanical transducers may be used to control the position, shape or vibration of various mechanical members, for example power transmission and distribution lines, acoustic speakers, underwater sonar, down hole robots, shock and vibration isolation. They may be used to enhance mixing of fluids in a well or to keep particles fluidized, for example to improve a gravel packing process. The electromechanical transducers could be used for down hole power generation. That is, large mechanical forces are available down hole to drive the mechanical connections of the transducers which would produce electrical power at the electrical connections. The essentially resistive, i.e. low reactance electrical connection, of the combined transducer will have a more efficient electrical coupling for recharging a down hole battery. The same transducer may be used to both send and receive signals at the same time by sensing the balance of voltage and current flowing to the transmitter, because received signals would generate back voltages which would effectively change the impedance of the transducer as seen from the driving circuits.

The present invention may be used for active noise cancellation or dampening. This can enhance the ability to transmit data. There are numerous sources of acoustic noise in the borehole environment, especially during drilling operations. For example, a drill bit generates various acoustic wave modes which travel up the drill string. This can interfere with acoustic telemetry of data through the drill string. Sensors can be placed near the drill bit to detect the acoustic noise generated by the bit. Then, noise cancellation circuitry can provide a waveform appropriate for canceling the noise. This waveform can be transmitted by the same transducer which transmits the telemetry data. The net result is that the signal receivers up hole will receive telemetry data with reduced noise interference.

In the above described embodiments, the capacitive transducer electrical connection is coupled in series with the inductive transducer electrical connection. In this way, the reactances of the two devices are combined to present a low resistive impedance to the driving circuitry. In alternative embodiments, impedance balancing can also be achieved by connecting the devices in parallel. Such a parallel combination has a resonant frequency at which its combined impedance is essentially purely resistive, but is a high resistive impedance instead of a low resistive impedance.

It is apparent that various changes can be made in the apparatus and methods disclosed herein, without departing from the scope of the invention as defined by the appended claims.

I claim:

1. An acoustic telemetry transducer comprising:
   a capacitive electromechanical transducer having an electrical connection and a mechanical connection responsive to vibration, and
   an inductive electromechanical transducer having an electrical connection coupled to the capacitive electromechanical transducer electrical connection and having a mechanical connection coupled to the capacitive electromechanical transducer mechanical connection.

2. A transducer according to claim 1, wherein the inductive electromechanical transducer electrical connection is coupled in series with the capacitive electromechanical transducer electrical connection.

3. A transducer according to claim 1, wherein:
   the inductive electromechanical transducer has an inductance value,
   the capacitive electromechanical transducer has a capacitance value, and
   the inductance value and the capacitance value are preselected so that the combined impedance of the coupled electrical connections of the inductive electromechanical transducer and the capacitive electromechanical transducer has a reduced reactance over a frequency band near a preselected frequency.

4. A transducer according to claim 3, wherein the mechanical connections of the capacitive electromechanical transducer and the inductive electromechanical transducer have a mechanical resonant frequency different from the preselected frequency, whereby the frequency band of reduced reactance is broadened.

5. A transducer according to claim 3, wherein the combined impedance is essentially resistive at the preselected frequency.

6. A transducer according to claim 1, wherein the capacitive electromechanical transducer comprises a piezoelectric material.

7. A transducer according to claim 6, wherein the piezoelectric material comprises a piezoceramic material.

8. A transducer according to claim 1, wherein the inductive electromechanical transducer comprises a magnetostrictive material.

9. An electromechanical transducer for use in a borehole comprising:
   a capacitive electromechanical transducer having an electrical connection and a mechanical connection responsive to displacement or strain, and
   an inductive electromechanical transducer having an electrical connection coupled to the capacitive electromechanical transducer electrical connection and having a mechanical connection coupled to the capacitive electromechanical transducer mechanical connection.

10. A transducer according to claim 9, wherein the inductive electromechanical transducer electrical connection is coupled in series with the capacitive electromechanical transducer electrical connection.

11. A transducer according to claim 9, wherein:
    the inductive electromechanical transducer has an inductance value,
    the capacitive electromechanical transducer has a capacitance value, and
    the inductance value and the capacitance value are preselected so that the combined impedance of the coupled electrical connections of the inductive electromechanical transducer and the capacitive electromechanical transducer has a reduced reactance over a frequency band near a preselected frequency.

12. A transducer according to claim 9, wherein the capacitive electromechanical transducer comprises a piezoelectric material.

13. A transducer according to claim 12, wherein the piezoelectric material comprises a piezoceramic material.

14. A transducer according to claim 9, wherein the inductive electromechanical transducer comprises a magnetostrictive material.

15. A transducer according to claim 9, wherein the capacitive electromechanical transducer comprises a flexible piezoelectric device bonded to the surface of a tubular element adapted for use in a borehole.

16. A transducer according to claim 9, wherein:
    the inductive electromechanical transducer comprises a section of a tubular element adapted for use in a borehole, and
    a coil surrounding the section of tubular element.

17. A transducer according to claim 16, wherein the section of tubular element comprises a magnetostrictive material.

18. A transducer according to claim 16, further comprising a cylindrical sleeve surrounding said coil having an upper end coupled to the tubular element above the coil and having a lower end coupled to the tubular element below the coil.

19. A transducer according to claim 18, wherein the sleeve is permanently magnetized.

20. A transducer according to claim 18, wherein the sleeve comprises a magnetostrictive material.

21. A borehole telemetry system for transmitting signals from a first location in a borehole to a second location in the borehole, comprising:
- an acoustic transmission medium extending from the first location to the second location,
- a first capacitive electromechanical transducer having an electrical connection and having a mechanical connection coupled to the acoustic transmission medium, and
- a first inductive electromechanical transducer having an electrical connection coupled to the first capacitive electromechanical transducer electrical connection and having a mechanical connection coupled to the acoustic transmission medium near the first capacitive electromechanical transducer.

22. A telemetry system according to claim 21, wherein the first inductive electromechanical transducer and the first capacitive electromechanical transducer are both coupled to the transmission medium at the second location and act in cooperation to receive signals.

23. A telemetry system according to claim 21, wherein the first inductive electromechanical transducer and the first capacitive electromechanical transducer are both coupled to the transmission medium at the first location and act in cooperation to transmit signals.

24. A telemetry system according to claim 23, wherein the first inductive electromechanical transducer electrical connection is coupled in series with the first capacitive electromechanical transducer electrical connection.

25. A telemetry system according to claim 23, wherein the first inductive electromechanical transducer mechanical connection is coupled to the first capacitive electromechanical transducer mechanical connection.

26. A telemetry system according to claim 23, wherein
the mechanical connection of the first inductive electromechanical transducer is out of phase with the mechanical connection of the first capacitive electromechanical transducer, and
the first inductive electromechanical transducer is spaced apart from the first capacitive electromechanical transducer by a distance related to the phase difference between the mechanical connection of the inductive electromechanical transducer and the mechanical connection of the capacitive electromechanical transducer.

27. A telemetry system according to claim 23, wherein the first inductive electromechanical transducer comprises a magnetostrictive material.

28. A telemetry system according to claim 23, wherein the first capacitive electromechanical transducer comprises a piezoelectric material.

29. A telemetry system according to claim 28, wherein the piezoelectric material comprises a piezoceramic material.

30. A telemetry system according to claim 23, further comprising:
- a second capacitive electromechanical transducer having an electrical connection and having a mechanical connection coupled to the acoustic transmission medium at the second location, and
- a second inductive electromechanical transducer having an electrical connection coupled to the piezoelectric device electrical connection and having a mechanical connection coupled to the acoustic transmission medium at the second location.

31. A telemetry system according to claim 30, further comprising a signal transmitter having an output coupled to the electrical connections of the first capacitive electromechanical transducer and the first inductive electromechanical transducer and thereby transmitting an acoustic signal through the acoustic transmission medium.

32. A telemetry system according to claim 31, wherein the signal transmitter transmits signals at one or more frequencies at which the combined reactance of the first capacitive electromechanical transducer and the first inductive electromechanical transducer is reduced.

33. A telemetry system according to claim 31, further comprising a signal receiver having an input coupled to the electrical connections of the second capacitive electromechanical transducer and the second inductive electromechanical transducer and thereby receiving the acoustic signal from the acoustic transmission medium.

34. A telemetry system according to claim 21, wherein the acoustic transmission medium comprises a drill string.

35. A telemetry system according to claim 21, wherein the acoustic transmission medium comprises production tubing.

36. A telemetry system according to claim 21, wherein the acoustic transmission medium comprises a slick line.

37. A telemetry system according to claim 21, wherein the acoustic transmission medium comprises a wire line.

38. A telemetry system according to claim 21, wherein the acoustic transmission medium comprises fluid in the borehole.

39. A telemetry system according to claim 21, wherein the acoustic transmission medium comprises earth formations surrounding the borehole.

40. A borehole telemetry system for transmitting signals from a first location in a borehole to a second location in the borehole, comprising:
- an acoustic transmission medium extending from the first location to the second location, and
- two transducer pairs, each pair comprising a first capacitive electromechanical transducer having an electrical connection and having a mechanical connection coupled to the acoustic transmission medium near the first location, and a first inductive electromechanical transducer having an electrical connection coupled to the first capacitive electromechanical transducer electrical connection and having a mechanical connection coupled to the acoustic transmission medium at a location spaced operatively from its corresponding capacitive electromechanical transducer.

41. A telemetry system according to claim 40, wherein
a first of the transducer pairs has a first pair inductive electromechanical transducer mechanical connection coupled to the acoustic transmission medium at a location spaced apart from the location at which the first pair capacitive electromechanical transducer mechanical connection is coupled to the acoustic transmission medium by a distance related to a first frequency and the phase difference between the first pair capacitive electromechanical transducer mechanical connection and the first pair capacitive electromechanical transducer mechanical connection, and
a second of the transducer pairs has a second pair capacitive electromechanical transducer mechanical connection coupled to the acoustic transmission medium at a location spaced apart from the location at which the second pair capacitive electromechanical transducer mechanical connection is coupled to the acoustic transmission medium by a distance related to a second frequency and the phase difference between the second pair inductive electromechanical transducer mechanical connection and the second pair capacitive electromechanical transducer mechanical connection.

42. A telemetry system according to claim 41, further comprising a telemetry transmitter having a first output coupled to the electrical connections of said first pair transducers, the first output selectively providing an electrical signal at the first frequency, and having a second output coupled to the electrical connections of said second pair transducers, the second output selectively providing an electrical signal at the second frequency.

43. A telemetry system according to claim 41, wherein the first pair inductive electromechanical transducer and the second pair inductive electromechanical transducer comprise the same inductive electromechanical transducer.

44. A telemetry system according to claim 41, wherein the first pair capacitive electromechanical transducer and the second pair capacitive electromechanical transducer comprise the same capacitive electromechanical transducer.

45. A telemetry system according to claim 41, wherein each of the capacitive electromechanical transducers comprises a piezoelectric material.

46. A telemetry system according to claim 45, wherein the piezoelectric material comprises a piezoceramic material.

47. A telemetry system according to claim 41, wherein each of the inductive electromechanical transducers comprises a magnetostrictive material.

48. A method for transmitting signals from a first location in a borehole to a second location in a borehole, comprising;

coupling the mechanical connection of a first capacitive electromechanical transducer to an acoustic medium at a first point near said first location, coupling the mechanical connection of a first inductive electromechanical transducer to the acoustic medium at a second point near said first location, the second point being spaced from the first point by a distance related to a first frequency and the phase difference between acoustic signals produced at the mechanical connections of said first capacitive and inductive transducers, coupling the electrical connections of the first capacitive and inductive transducers together to form a first circuit, coupling the mechanical connection of a second capacitive electromechanical transducer to an acoustic medium at a third point said first location, coupling the mechanical connection of a second inductive electromechanical transducer to the acoustic medium at a fourth point near said first location, the fourth point being spaced from the third point by a distance related to a second frequency and the phase difference between acoustic signals produced at the mechanical connections of said second capacitive and inductive transducers, coupling the electrical connections of the second capacitive and inductive transducers together to form a second circuit.

49. A method according to claim 48, further comprising:

coupling electrical signals to said first circuit at about said first frequency, and coupling electrical signals to said second circuit at about said second frequency.

* * * * *